United States Patent [19]

Jury

[11] 4,005,987
[45] Feb. 1, 1977

[54] PROCESS FOR DRYING MOIST MATERIALS, PARTICULARLY CRYSTALLINE SOLIDS CONTAINING WATER OF HYDRATION

[75] Inventor: Egon Jury, Egelsbach-Bayerseich, Germany

[73] Assignee: Metallgesellschaft Aktiengesellschaft, Frankfurt am Main, Germany

[22] Filed: Sept. 30, 1974

[21] Appl. No.: 510,738

[30] Foreign Application Priority Data

Oct. 1, 1973 Germany .................... 2349211

[52] U.S. Cl. ............ 23/313 FB; 159/4 CC; 34/168; 423/558
[51] Int. Cl.² ...................... C01G 49/14
[58] Field of Search ..... 23/313 R, 313 AS, 313 FB; 425/222; 264/DIG. 51; 159/4 CC; 34/168, 33, 10, 22; 432/14, 15, 17; 423/558

[56] References Cited

UNITED STATES PATENTS

| | | | |
|---|---|---|---|
| 1,713,237 | 5/1929 | Morin | 34/168 |
| 2,308,992 | 1/1943 | Mertens | 159/4 CC |
| 2,335,732 | 11/1943 | Bowen | 159/4 CC |
| 2,532,335 | 12/1950 | Royster | 432/14 |
| 2,567,959 | 9/1951 | Munday | 23/313 FB |
| 2,586,818 | 2/1952 | Harms | 23/313 FB |
| 2,635,684 | 4/1953 | Joscelyne | 159/4 CC |
| 3,391,003 | 7/1968 | Armstrong | 23/313 FB |
| 3,547,179 | 12/1970 | Hussmann | 159/4 CC |
| 3,700,461 | 10/1972 | Dickens | 23/313 FB |
| 3,735,792 | 5/1973 | Asizawa | 159/4 CC |
| 3,748,103 | 7/1973 | Bean | 23/313 FB |
| 3,842,888 | 10/1974 | Gibbons | 159/4 CC |
| 3,844,726 | 10/1974 | Denaeyer | 23/313 FB |
| 3,849,233 | 11/1974 | Lykov et al. | 159/4 CC |
| 3,884,645 | 5/1975 | Kinne | 23/313 FB |

FOREIGN PATENTS OR APPLICATIONS 1,142,046 2/1969 United Kingdom ........... 23/313 FB

*Primary Examiner*—Stephen J. Emery
*Attorney, Agent, or Firm*—Karl F. Ross; Herbert Dubno

[57] ABSTRACT

A process for drying moist material, particularly substances containing water of crystallization, in which the material is passed in counterflow through a shaft to gases having an inlet temperature of 200° to 1000° C. The gas rises at a velocity of 2 to 30 m/sec. and the moist substances are introduced into the shaft in a high-density stream so that the moist materials agglomerate concurrently with the drying.

2 Claims, 1 Drawing Figure

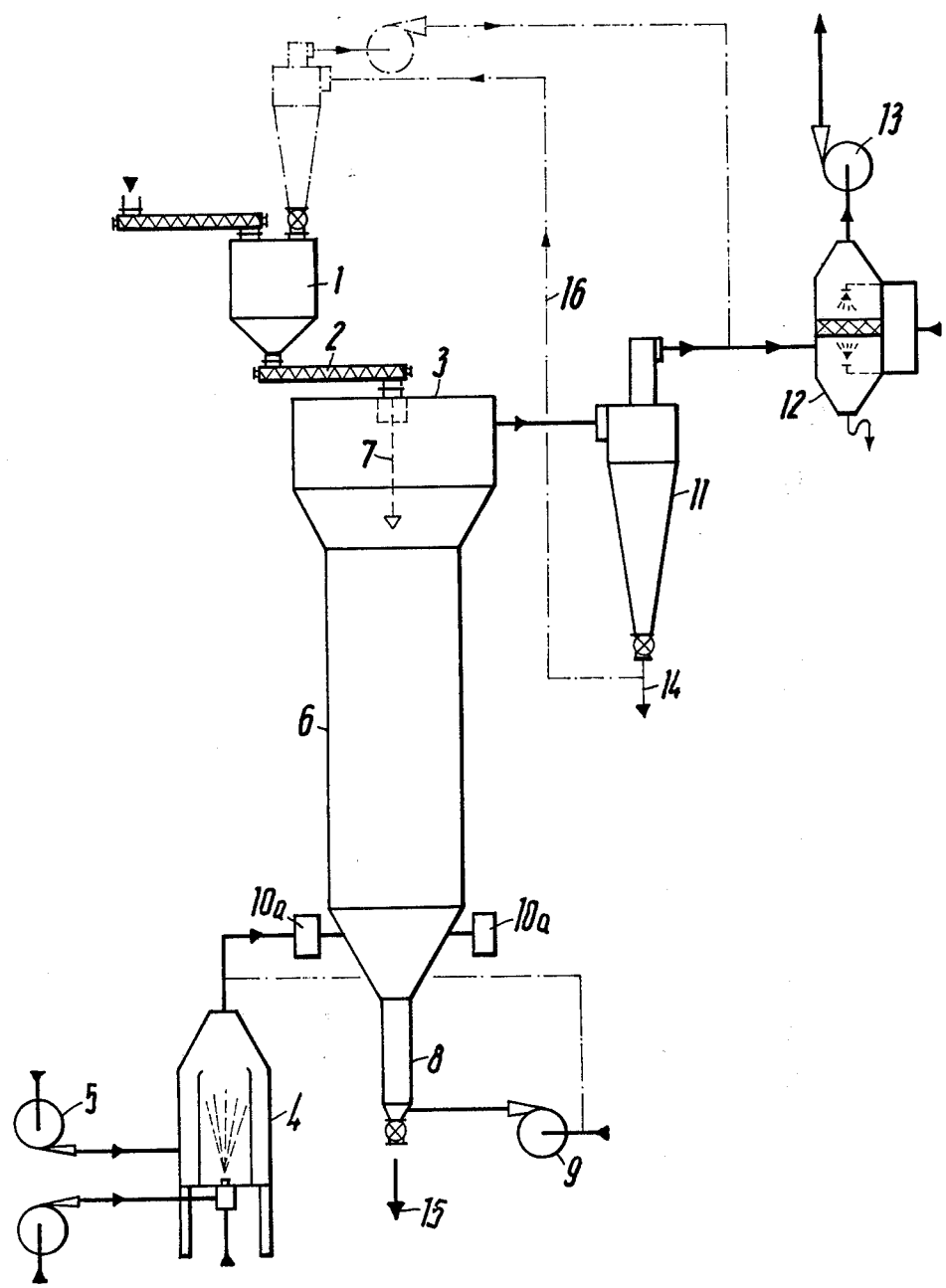

PROCESS FOR DRYING MOIST MATERIALS, PARTICULARLY CRYSTALLINE SOLIDS CONTAINING WATER OF HYDRATION

FIELD OF THE INVENTION

This invention relates to a process for drying moist materials, particularly compounds which contain water of crystallization, in a shaft by a treatment with gases which flow in countercurrent to the moist materials and have an inlet temperature of 200°–1000° C.

BACKGROUND OF THE INVENTION

A large number of materials in a moist state after a production process must be dried. Such materials include salts which contain mechanically and/or chemically bonded moisture.

In most of the drying processes which have been used heretofore, the feed is charged in a dissolved, molten or solid state.

For drying a salt which contains water of crystallization, such as magnesium chloride, the concentrated solution or the melt can be treated with hot gases flowing in a countercurrent. Apart from numerous other examples, the drying of iron sulfateheptahydrate, which is obtained particularly from pickling plants or in the processing of ilmenite and must usually be dried to monohydrate before it is processed further, is of great significance. The iron sulfate solution may be atomized into hot drying gases. This results in a product which contains less than 2 moles or water of crystallization. Instead of a solution, a suspension which is kept at a temperature of 65°–90° C. and which has a composition corresponding approximately to the formula $FeSO_4 \cdot 7\text{–}10H_2O$ can be spray-dried in counterflowing drying gases at a temperature of 150°–900° C. Iron sulfateheptahydrate may also be dried in a fluidized-bed reactor, which is operated with the exhaust gases from a decomposition reactor. In another process, the iron sulfateheptahydrate in a comminuted state is exposed to hot gases so that monohydrate is formed within a very short time. The process is controlled to give a product having a particle size below 1600 mesh.

The main disadvantages of these known processes for treating salts which are molten to remove their water of crystallization resides in that the dried product has a very small particle size so that the separation of the product involves a relatively high expenditure. Also, it is difficult to handle, store or process the dried product because it has such a small particle size.

OBJECT OF THE INVENTION

It is an object of the invention to provide a drying process which avoids the disadvantages of the prior-art systems and which particularly results in a dried product which can be separated and handled in a simple manner and can be processed in subsequent processes, if desired, without a high expenditure.

SUMMARY OF THE INVENTION

In a process of drying moist materials, particularly materials which contain water of crystallization, in a shaft by a treatment with counterflowing gases having an inlet temperature of 200°–1000° C., this object is accomplished according to the invention in that the moist substances are charged as a stream of high density into a hot gas stream which rises at a velocity of 2–30 meters per second, preferably 8–25 meters per second, so that the moist materials are agglomerated at the same time.

A charging in a stream of high density can be accomplished in that the starting material is charged preferably centrally and continuously at the top of the drying shaft, e.g., by means of a stationary or vibrating metering trough. In conjunction with the high velocity of the drying gas, that charging mode has the result that the invidivual particles which are superficially fused by the hot drying gases are so closely spaced apart that they form larger agglomerates. The selected velocity of the drying gas will mainly depend on the particle size of the end product which is formed. In most practical cases, velocities of 8–25 meters per second of the drying gas will be sufficient, although lower or higher velocities of the drying gas may be required in extreme cases. The selected gas velocities will depend on the product, the hot gas inlet and exit temperatures which may be employed, and the length of the drying path. Depending on the nature and moisture content of the starting materials, the formation of the agglomerates begins immediately after the starting materials have been charged and is continued as they fall through the drying shaft. The formation of agglomerates may be assisted by an admixing therewith of adjuvants, such as water or dissolved salts, and a formation of excessively large lumps can be prevented by an admixing of previously dried material, such as the fines from a cyclone separator. The bond is sufficiently strong so that the agglomerated state is maintained during the further movement through the drying shaft and after the discharge therefrom.

The strength of the agglomerates must be sufficiently high particularly during the discharge, which involves mechanical stresses, and their strength may be increased if, according to a preferred feature of the invention, the agglomerate material is cooled with cold air in the lower portion of the drying shaft.

Because the agglomeration begins and proceeds very quickly, only a very small amount of fines is discharged in spite of the relatively high velocity of the drying gas. A production of fines may be entirely avoided if, according to a further feature of the invention, fines are recycled to the feed and are thus again fed into the drying shaft.

The process according to the invention is particularly suitable for the drying of compounds which contain water of crystallization. Examples are:

Examples are:

| Compound | Melting Point |
|---|---|
| $FeSO_4 \cdot 7H_2O$ | 64° C. |
| $MgSO_4 \cdot 7H_2O$ | about 70° C. |
| $Na_2SO_4 \cdot 10H_2O$ | 32.4° C. |
| Alums, such as $CrK(SO_4)_2 \cdot 12H_2O$ | 89° C. |
| $Cu(NO_3)_2 \cdot 6H_2O$ | 24.4° C. |
| $Fe(NO_3)_2 \cdot 9H_2O$ | 50.1° C. |
| $Mg(NO_3)_2 \cdot 6H_2O$ | 90° C. |
| $Na_2HPO_4 \cdot 12H_2O$ | 34.6° C. |
| $Na_2CO_3 \cdot 10H_2O$ | 32° C. |
| $Na_2B_4O_7 \cdot 10H_2O$ | 75° C. |
| $FeCl_3 \cdot 6H_2O$ | 37° C. |
| $CuCl_2 \cdot 2H_2O$ | 110° C. |
| $MgCl_2 \cdot 6H_2O$ | 117° C. |
| $Ba(OH)_2 \cdot 8H_2O$ | 78° C. |
| $CaSO_4 \cdot 2H_2O$ | 128° C. |

Other materials may be subjected to the process according to the invention, provided that they withstand the required drying gas temperatures.

The drying gas temperatures which are most suitable for the drying can be determined in a simple manner. A useful guide is, e.g., the melting point of the material to be treated. For materials having lower melting points, lower values will usually be selected for the drying gas temperature and the exhaust gas temperature related thereto than for materials having a higher melting point.

For the purposes of the present invention, drying does not necessarily involve a quantitative removal of mechanically and particularly chemically combined water but means any removal of water. As a rule, a transformation into compounds having a low content of water of crystallization takes place. In the application which is most interesting technologically, the drying of iron sulfaheptahydrate, the resulting product usually contains 1-2 moles water of crystallization.

BRIEF DESCRIPTION OF THE DRAWING

The invention will now be described more fully and by way of illustration with reference to the drawing, the sole FIGURE of which is a flow diagram of the process according to the invention.

SPECIFIC DESCRIPTION

The drawing shows a drying plant, in which the salt is fed from a bin 1 by a metering screw conveyor 2 through the center of the top 3 of the drying chamber into the latter.

The drying gas is produced by the combustion of gas or oil in furnace 4. By means of a blower 5, air is admixed to the flue gas with such a ratio that the desired hot gas temperatures are ensured.

The hot drying gas is introduced into the drying chamber 6 at the lower end thereof and then flows upwardly through the chamber in a countercurrent to the falling salts 7 and thus results in a drying and agglomeration of the salt.

The dried salt then falls through a narrower discharge pipe 8. If a cooling of the end product is required, air flowing also in a countercurrent may be passed through the discharge pipe by means of another blower 9.

The same stage may be used for another treatment with hot drying gases if, instead of cold air, hot gas is blown through the conduit 10 into the distributor 10a. In that case too, a succeeding cooling stage may be provided.

The exhaust gas leaves the drying tower at the top and enters a cyclone separator 11 and then a wet scrubbing plant 12, from which it is sucked off by a blower 13.

The fines collected in the cyclone plant may be added to the tower product or may be admixed through conduit 1 to the feed. In this case the entire product discharged from the drying chamber will consist of a coarse-grained product obtained from the drying chamber.

In the drawing, the fines to be recycled are pneumatically conveyed in the conduit 16 so that the temperature of the material handled can be influenced by the entraining fluid.

SPECIFIC EXAMPLES

EXAMPLE 1

Iron sulfaheptahydrate is fed by a metering device into the equipment described hereintofore. Hot gas at a temperature of about 500° C. is used for dewatering. As the gas takes up water, its temperature is reduced so that the gas has a temperature of about 100° C. as it leaves the shaft. From the lower portion of the shaft, iron sulfate containing about 1.3-1.7 moles residual water of crystallization and having a particle diameter of mainly 0.5-5 millimeters is withdrawn.

EXAMPLE 2

The following parameters are obtained when sodium sulfate decahydrate is fed:

| | |
|---|---|
| Hot gas temperature | about 500° C. |
| Exhaust air temperature | about 85° C. |

The end product contains almost no water of crystallization and has a residual water content of 1-3%.

| | |
|---|---|
| Main particle diameter | 0.3 to 4 millimeters |

EXAMPLE 3

The following parameters are obtained for calcium sulfate dihydrate:

| | |
|---|---|
| Hot gas temperature | about 530° C. |
| Exhaust gas temperature | about 190° C. |

The end product contains 0.5 mole water of crystallization.

| | |
|---|---|
| Main particle diameter | 0.2 to 2.5 millimeters |

I claim:
1. A process for removing water of hydration from iron sulfate heptahydrate and agglomerating the resulting crystalline solid which comprises the steps of:
   A. passing a hot gas stream upwardly through a shaft at a velocity of 2 to 30 m/sec and an inlet temperature of substantially 500° to 1000° C,
   B. introducing particles of said crystalline solid into said shaft at an upper portion thereof,
   C. permitting said particles to descend in counterflow to said gas stream whereby said particles agglomerate while water of hydration is driven off,
   D. cooling the agglomerated material at a lower portion of said shaft below that at which said hot gas stream is introduced by treating the agglomerated material with cold air,
   E. recovering fine particles from said hot gas stream upon its emergence from said shaft, and
   F. adding the recovered fine particles to the solid introduced into said shaft.
2. The process defined in claim 1 wherein said velocity is 8 to 25 m/sec.

* * * * *